UNITED STATES PATENT OFFICE.

LIVINGSTON GIFFORD, OF JERSEY CITY, NEW JERSEY, ADMINISTRATOR OF KARL HEUMANN, DECEASED, ASSIGNOR TO THE BADISCHE ANILIN AND SODA FABRIK, OF LUDWIGSHAFEN, GERMANY.

BLUE DYE.

SPECIFICATION forming part of Letters Patent No. 621,652, dated March 21, 1899.

Application filed December 17, 1897. Serial No. 662,305. (Specimens.)

*To all whom it may concern:*

Be it known that KARL HEUMANN, deceased, late of Zurich, Switzerland, did invent a new and useful Improvement in the Manufacture of a new Blue Dyestuff Soluble in Water, of which the following is a specification, and for which patents were obtained in the following countries: England, No. 8,726, dated June 5, 1890; France, No. 206,567, dated June 23, 1890; Belgium, No. 91,156, dated July 15, 1890; Germany, No. 58,276, dated August 15, 1890; Spain, No. 11,005, dated August 21, 1890; Italy, XXIV, 27,841, Liv. 453, dated September 30, 1890; Austria, No. 40/3,802, dated December 12, 1890.

Although ortho-tolyl-glycocol which can be prepared by the action of mono-chlor-acetic acid on ortho-toluidin has been known to chemists since the year A.D. 1880, (see journal of the Chemical Society, 38, 387, *Berichte der Deutschen Chemischen Gesellschaft 13, 137*,) still up to the time of the present invention it is believed that it had found no application in the arts and that it was not known that it could in any way be used in the manufacture of useful dyestuffs.

The present invention includes the discovery that by suitable treatment this body ortho-tolyl-glycocol can be converted into a new blue dyestuff possessing most valuable properties. Judging from the manner of its formation this dyestuff is a dimethyl-derivative of indigo. It differs from indigo in its chemical constitution and in some of its properties, but still resembles this most valuable dyestuff in its dyeing properties, being capable of application to the fiber in the same ways and yielding slightly-different blue shades, so that it is capable of entirely supplanting natural indigo in many, if not all, of its applications.

The following is an example of the manner in which the said new dyestuff can be prepared: Mix thoroughly about one part, by weight, of tolyl-glycocol and two parts, by weight, of solid caustic potash and heat the mixture rapidly to a temperature of about 300° centigrade and then gradually to about 335° to 340° centigrade until the orange color of the melt no longer increases in intensity. During this operation exclude the air as far as possible. Next dissolve the melt in water and blow air through until no more blue precipitate forms. Filter, wash with water containing a little hydrochloric acid, and finally with cold alcohol, and dry the indigo compound which remains on the filter. Instead of the caustic potash in the above example caustic soda can be used or mixtures of the two alkalies. The new dyestuff thus obtained resembles ordinary indigo in appearance, being a dark-blue powder acquiring a copper-colored luster on rubbing. On heating it volatilizes and sublimes with purple-red vapor. It is insoluble in water and slightly soluble in alcohol, particularly when hot. It is somewhat soluble in benzene at ordinary temperatures and more easily on heating, whereas ordinary indigo is very nearly or practically quite insoluble in this liquid. It is also somewhat soluble in cold anilin. When dyed upon cotton from the indigo-vat, a greener shade of blue is obtained than with ordinary indigo.

This new blue dyestuff in its unsulfonated form is not claimed in this application for Letters Patent, but forms the subject-matter of a separate application, filed December 27, 1897, Serial No. 663,715. The present invention is based upon the discovery that the said blue dyestuff can by sulfonation be converted into a new sulfoacid, a dyestuff readily soluble in water, differing in its chemical and dyeing properties from ordinary indigo-blue sulfoacid, known in commerce as "indigo-carmine."

As examples to illustrate this invention and the manner in which it can be carried into practical effect the following directions are given:

Example 1: Mix about one part, by weight, of the new blue dyestuff with about ten parts, by weight, of ordinary concentrated sulfuric acid and heat the mixture at the temperature of the boiling-water bath until a test portion yields a clear solution in water. This point being arrived at, dissolve the whole in water and precipitate the sulfoacid from the solution by the addition of common salt. Filter, press, and dry and, if desired, convert into an alkaline salt.

Example 2: Mix about one part, by weight, of the new blue dyestuff with about six parts, by weight, of weakly-fuming sulfuric acid and allow the mixture to stand at a temperature of, say, about 50° centigrade or at a lower temperature until a sample is readily soluble in water. The lower the temperature at which the sulfonation is conducted the longer is the time required to attain complete solubility in water. The sulfoacid formed is isolated in the manner above described—namely, by dissolving the whole in water, precipitating with common salt, filtering, pressing, and drying.

Instead of concentrated or fuming sulfuric acid mono-chlor-hydrin sulfuric acid ($SO_3HCl$) or sulfuric acid mixed with dehydrating agents can be used, when the result is similar and the same product is obtained.

This new dyestuff in the form of the free sulfoacid is characterized by the following properties: It is a dark-blue powder resembling indigo-carmine in appearance, readily soluble in both hot and cold water. It is scarcely soluble in alcohol and practically insoluble in ether. Boiling glacial acetic acid only dissolves it in sufficient quantity to just colorize the solution weakly blue, whereas the sulfoacid of ordinary indigo, known in commerce as "indigo-carmine," dissolves in such quantity in boiling glacial acetic acid that the solution is very intensely blue.

This new sulfoacid dyes wool from the boiling-acid bath, yielding redder shades of blue than the above-mentioned indigo-carmine.

What is claimed is—

As a new article of manufacture the sulfo acid which can be derived from caustic alkalies and tolyl-glycocol and which is a dark-blue powder readily soluble both in hot and cold water, scarcely soluble in alcohol, practically insoluble in ether; boiling glacial acetic acid only dissolves it in sufficient quantity to just color the solution weakly blue; it dyes wool from the boiling-acid bath, yielding redder shades of blue than the above-mentioned indigo-carmine, substantially as described.

LIVINGSTON GIFFORD,
*Administrator of the estate of Karl Heumann, deceased.*

Witnesses:
M. WILSON,
J. E. GREER.